Nov. 12, 1935.　　　A. F. McNISH　　　2,021,013
APPARATUS FOR CIRCULATING THE GLASS IN GLASS FURNACE GATHERING BASINS
Filed Aug. 5, 1933
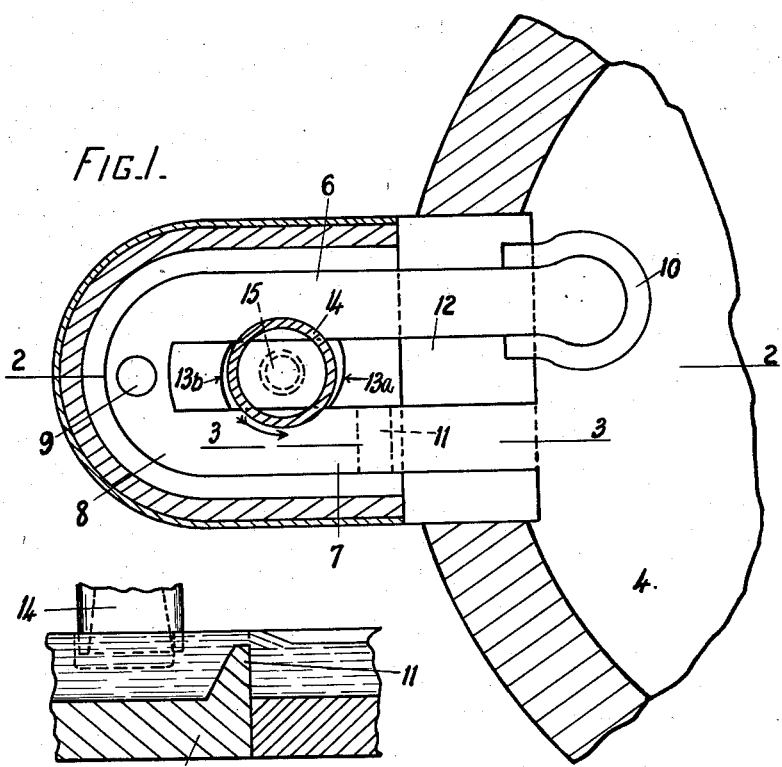
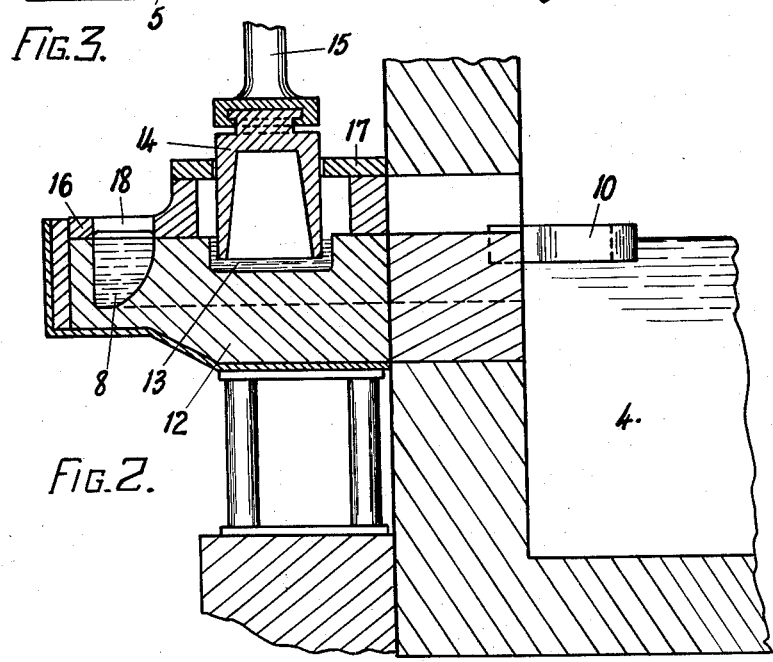
INVENTOR:
ALEXANDER FRANCIS McNISH
By Williams, Bradbury, McCaleb & Hinkle.
ATTYS.

Patented Nov. 12, 1935

2,021,013

UNITED STATES PATENT OFFICE 2,021,013

APPARATUS FOR CIRCULATING THE GLASS IN GLASS FURNACE GATHERING BASINS

Alexander Francis McNish, Perth, Scotland

Application August 5, 1933, Serial No. 683,877
In Great Britain July 13, 1933

20 Claims. (Cl. 49—56)

This invention relates to an improved method of and apparatus for circulating a stream of glass in a glass furnace gathering basin of the kind in which laterally separated inlet and outlet channels opening into the furnace are connected at their outer ends by a connecting channel which forms a gathering station from whence the glass is gathered by suitable gathering devices.

It is known to circulate the glass in such a gathering basin by means contacting with the exposed surface of the glass in the channel and transversely disposed over the said exposed surface and for this purpose it has been proposed to employ paddle wheels or rotary drums mounted to turn upon a horizontal axis, the said paddle wheels or drums having either a smooth or corrugated surface or being in the form of a polygonal drum or radial vanes or blades arranged to dip into or to be immersed in the exposed surface of the glass in the channel and to circulate the glass over a weir arranged in the outlet channel. It is also known to circulate the glass in the basin by means of a paddle member dipping into the exposed surface of the glass and movable in a vertically disposed orbital path located wholly or partly within the glass.

The present invention has for one of its objects to provide an improved apparatus for causing the glass to flow through the gathering basin and to enable a constant level of glass to be maintained at the gathering station and it is a characteristic feature of the present invention that the use of circulating devices disposed over the exposed surface of the glass are eliminated, thereby enabling the exposed surface of the glass to be completely covered in except for a gathering opening at the gathering position.

The invention comprises propelling the glass through the channels of the gathering basin by contact of one side of the stream of glass with a substantially vertical moving wall section interposed in one of the side walls of the inlet or outlet channels of the gathering basin, the moving wall section travelling in lateral contact with the whole or part of the depth of the side of the stream of glass to cause the circulation of the glass through the gathering basin.

The invention further comprises propelling the glass by lateral contact of one side of the stream of glass with a substantially vertical moving wall section interposed in a dividing wall between the inlet and outlet channels, preferably by lateral contact of the whole or part of the depth of one side of the stream of glass with opposite sides of a substantially vertical endless travelling wall section interposed in a wall or walls laterally separating the inlet and outlet channels.

The invention further comprises propelling the glass through the channels by frictional contact of one side of the stream of glass with a substantially vertical rotating wall which is in lateral contact with the sides of the stream of glass over the whole or part of the depth of the said stream.

The level of the glass at the gathering station may be regulated and maintained substantially constant and at a height above the level of the glass at the inlet end of the inlet channel by traversing the vertical wall section or rotating the rotary vertical wall which is in lateral contact with the stream of glass at a speed which is sufficient to induce a greater inflow of glass into the inlet channel than outflow of glass from the outlet channel, thereby to compensate for the charges of glass withdrawn by gathering devices from the basin at the gathering station.

The speed of travel of the moving wall section or the speed of rotation of the rotary vertical wall in lateral contact with the stream of glass and/or its depth of lateral contact with the glass may be varied according to the rate at which glass is gathered and/or according to the level of the glass at the inlet end of the channel, so that a substantially constant level of the glass at the gathering position can be maintained irrespective of fluctuations in the level of glass in the glass furnace.

The moving wall section or rotary vertical wall preferably takes the form of a propeller extending partly into one side of the stream of glass in the channel and having means for traversing the propeller or for rotating the propeller about a vertical or substantially vertical axis in a direction to cause propulsion of the stream of glass by lateral contact with the surface of the said propeller.

In the preferred manner of carrying out the invention, a rotary propeller is employed mounted upon a vertical or substantially vertical axis, so that the surface of the said propeller makes lateral contact with one side of the stream of glass over the whole or part of the depth of the said stream and the propeller is preferably mounted in a dividing wall separating the inlet and outlet channels so that part of the surface of the propeller makes lateral contact with the stream of glass in the inlet channel or outlet channel or in such a manner that opposite sides of the surface of the propeller make lateral contact with the streams of glass in the inlet and outlet channels respectively.

The rotary propeller is preferably positioned in a recess in an insular wall which separates the inlet and outlet channels, the surface of the rotary propeller protruding laterally from the recess at one or both sides of the said insular wall so as to rotate in lateral contact with the stream of glass in the channels and means are provided for rotating the said propeller about a vertical or substantially vertical axis.

The propeller may be a cylinder or conical frustum or other shape, circular or substantially circular in horizontal section, and preferably it is formed with a smooth outer surface, but if desired the propeller may be a polygonal prism or a fluted, corrugated or ribbed cylinder or prism mounted to turn upon a vertical axis or it may consist of a rotary member having radially projecting vanes or blades and likewise mounted to turn about a vertical axis.

In order to enable the depth of lateral surface contact between the propeller and the side of the stream of glass to be varied, the propeller is preferably mounted so that it can be raised or lowered to enable the speed of circulation of the glass in the gathering basin to be varied according to requirements. The speed at which the glass is circulated through the gathering basin may also be varied by varying the speed of rotation of the propeller.

It is preferred to circulate the glass over a weir in the outlet channel, the said weir being provided in known manner to maintain a minimum level of glass in the gathering basin.

In order that the invention may be more clearly understood, reference is hereinafter made to the accompanying drawing whereon Fig. 1 is a horizontal sectional plan view through the gathering basin with the cover removed.

Fig. 2 is a vertical cross-sectional view on the line 2—2 of Fig. 1 showing the cover in position.

Fig. 3 is a vertical sectional view on the line 3—3 of Fig. 1 with the cover of the gathering basin removed.

The drawing shows a glass furnace comprising a tank 4 at the front of which is mounted a gathering basin 5 having an inlet channel 6, an outlet channel 7 and an outer connecting channel 8. A gathering mould is indicated by the circle 9 in Fig. 1 to indicate the gathering position. The glass enters the channel 6 from the tank 4 after passing beneath the skimmer block 10 which may be of any suitable construction and the return of glass from the outlet channel 7 to the furnace is controlled by a weir 11 in the outlet channel 7. This weir extends transversely across the channel 7 from an insular wall 12 which laterally separates the channels 6 and 7. The insular wall 12 is provided intermediate its ends with a recess 13 into which dips a refractory rotary member or propeller 14 which is carried in any convenient manner at the lower end of a rotary driving shaft 15. The exposed surface of the glass in the channels 6, 7 and 8 is covered in by cover plates 16 which also rest upon the insular block 12 and support an apertured cover plate 17 through which the propeller 14 is introduced. The cover 16 is provided with an aperture 18 at the gathering position to enable the introduction of suitable gathering devices.

It will be seen that the surface of the propeller 14 projects at both sides beyond the vertical surfaces of the insular wall 12 into the side of the stream of glass in the channels 6 and 7.

The sides 13a and 13b (Fig. 1) of the recess in the insular wall 12 may be either eccentric to the axis of the propeller as shown in Fig. 1 or concentric therewith as may be found most suitable.

In operation the propeller 14 is rotated at a speed consonant with the nature of the glass and the rate at which the glass is gathered from the basin. It has been found, for example, that with a propeller of 14 inches diameter, efficient circulation of the glass can be effected at a speed of rotation of the propeller of from 3 to 10 revolutions per minute. It will, however, be understood that the speed of rotation of the propeller will vary according to the nature of the glass, the diameter of the propeller and the depth to which it is immersed in the glass. The propeller is rotated in the direction of the arrow and by lateral contact with the stream of glass, the latter is propelled towards the gathering position and returned from the gathering position through the channel 7 and over the weir 11 to return it to the furnace.

The device enables the level of the glass at the gathering position to be maintained above the level of the glass in the furnace and the level at the gathering position does not materially fluctuate provided that the glass is maintained in the furnace at a reasonable height above the bottom of the channel 6.

The level of the glass at the gathering position can be regulated according to varying rates of gather by raising or lowering the propeller 14 or by varying its speed of rotation.

The drawing shows a substantially cylindrical propeller 14 having a smooth periphery, the propeller being made hollow to reduce weight, but the propeller 14 may be either solid or hollow and either open or closed at the bottom and instead of being of cylindrical shape it may be a fluted, corrugated or ribbed cylinder or conical frustum or it may be a solid or hollow polygonal block suspended from the lower end of the shaft 15. As a further variant, the propeller 14 may be in the form of a cylinder or block having radially extending vanes or blades adapted to enter the side of the stream of glass.

Although it is preferred to continuously rotate the propeller 14, it may be found desirable or convenient to impart an intermittent rotary movement to the propeller 14 in the direction of the arrow shown on the drawing, effecting the rotary movement in the intervals between the gathering operations.

The clearance space between the periphery of the propeller and the sides 13a, 13b of the recess will vary according to circumstances but should in general not exceed approximately one inch in breadth.

The recess 13 in the insular wall 12 may be of any convenient depth so long as it efficiently separates the flow of glass in the channel 6 from the flow of glass in the channel 7.

Although the drawing shows the propeller mounted at an intermediate point in the insular wall 12, it is to be understood that the propeller might alternatively be mounted in either of the outer walls of the channels 6 and 7 or additional propellers might be mounted in the said outer walls. Likewise where the distance between the channels 6 and 7 is materially greater than that shown on the drawing, necessitating, for example, the employment of a hollow insular wall in place of the wall 12, two or more propellers may be provided, one or more propellers protruding into the stream of glass in the channel 6 and one or more propellers protruding into the channel 7.

I claim:

1. The combination with a tank to contain molten glass, of apparatus for circulating glass comprising a gathering basin located externally of the tank and having laterally separated inlet and outlet channels opening into the tank and an intermediate outer connecting channel providing a gathering station, means for propelling glass from the tank through the channels past the gathering station, said propelling means comprising a substantially vertical moving wall section located externally of the tank and interposed between sections of one of the side walls of the inlet and outlet channels, and means for causing said moving wall section to travel in lateral contact with the side of the stream of glass in the channel.

2. The combination with a tank to contain molten glass, of apparatus for circulating glass comprising a gathering basin located externally of the tank and having laterally separated inlet and outlet channels opening into the tank and an intermediate outer connecting channel providing a gathering station, means for propelling glass from the tank through the channels past the gathering station, said propelling means comprising a substantially vertical moving wall section located externally of the tank and interposed between sections of one of the side walls of the inlet and outlet channels, and means for causing said moving wall section to travel in lateral contact with the side of the stream of glass in the channel, said moving wall section being spaced above the floor of the channel whereby it contacts with the stream a part only of its full depth.

3. The combination with a tank to contain molten glass, of apparatus for circulating glass comprising a gathering basin located externally of the tank and having laterally separated inlet and outlet channels opening into the tank and an termediate outer connecting channel providing a gathering station, and means for propelling glass from the tank through the channels past the gathering station, said propelling means presenting at each instant, two substantially vertical and oppositely moving surface portions located externally of the tank and each in lateral contact with one side of the stream of glass, one said moving surface portion being interposed between stationary wall sections of one side wall of the inlet channel and the other said moving surface portion being interposed between stationary wall sections of one side wall of the outlet channel.

4. The combination with a tank to contain molten glass, of apparatus for circulating glass comprising a gathering basin located externally of the tank and having laterally separated inlet and outlet channels opening into the tank and an intermediate outer connecting channel providing a gathering station, and means for propelling glass from the tank through the channels past the gathering station, said propelling means presenting at each instant, two substantially vertical and oppositely moving surface portions located externally of the tank and each in lateral contact with one side of the stream of glass, one said moving surface portion being interposed between stationary wall sections of one side wall of the inlet channel and the other said moving surface portion being interposed between stationary wall sections of one side wall of the outlet channel, said moving surface portions being spaced above the level of the channels, whereby they contact with the stream of glass through a part only of its full depth.

5. The combination with a tank to contain molten glass, of a gathering basin located externally of the tank and having laterally separated inlet and outlet channels opening into the tank and an intermediate outer connecting channel which provides a gathering station, said basin including a partition wall positioned externally of the tank and laterally separating the inlet and outlet channels, and means for propelling a stream of glass through said channels, said propelling means comprising a substantially vertical endless traveling wall section in said partition between said inlet and outlet channels and in lateral contact with the stream of glass flowing through said channels.

6. The combination with a tank to contain molten glass, of a gathering basin located externally of the tank and having laterally separated inlet and outlet channels opening into the tank and an intermediate outer connecting channel which provides a gathering station, said basin including a partition wall positioned externally of the tank and laterally separating the inlet and outlet channels, and means for propelling a stream of glass through said channels, said propelling means comprising a substantially vertical endless traveling wall section in said partition between said inlet and outlet channels and in lateral contact with the stream of glass flowing through said channels, said traveling wall section being spaced above the floor level of the channels, whereby it contacts with the flowing stream for a part only of its full depth.

7. The combination with a tank to contain molten glass, of a gathering basin located externally of the tank and having laterally separated inlet and outlet channels opening into the tank and an intermediate outer connecting channel which provides a gathering station, said basin including a partition wall positioned externally of the tank and laterally separating the inlet and outlet channels, and means for propelling a stream of glass through said channels, said propelling means comprising a substantially vertical rotating wall externally of the tank and in frictional contact with one side of the stream of glass, said rotating wall being positioned at one side of a said channel and forming in effect a portion of the side wall of said channel, said portion as a whole moving with and in the direction of movement of the stream.

8. In apparatus for circulating glass as claimed in claim 1, means for maintaining a substantially constant level of glass at the gathering station by varying the speed of travel of the vertical moving wall according to the rate at which glass is gathered from the stream.

9. In apparatus for circulating glass as claimed in claim 7, means for maintaining a substantially constant level of glass at the gathering station by varying the speed of rotation of the vertical rotating wall according to the level of the glass at the inlet end of the inlet channel.

10. In apparatus for circulating glass as claimed in claim 1, means for maintaining a substantially constant level of glass at the gathering station by varying the depth of lateral contact of the moving wall section with the side of the stream of glass.

11. In apparatus for circulating glass as claimed in claim 7, means for maintaining a substantially constant level of glass at the gathering station which consists in varying the depth of lateral contact of the rotary vertical wall with the side of the stream of glass.

12. The combination with a tank to contain molten glass of a gathering basin located externally of the tank and having laterally separated inlet and outlet channels opening into the tank and an outer connecting channel providing a gathering station, a propeller extending through one side wall of one of said channels into one side of the stream of glass flowing through the channel and presenting to the said stream a substantially vertical surface forming a portion of the side wall of the channel, and means for moving said propeller in a direction to cause said surface as a whole to advance in the direction of the advancing stream and thereby cause propulsion of the stream of glass by lateral contact of an appreciable depth of one side of said stream with the said surface of said propeller.

13. The combination with a furnace tank, of a gathering basin located externally of the tank and having laterally separated inlet and outlet channels opening into the tank and an outer connecting channel providing a gathering station, of a rotary propeller extending partly through one side wall of one of said channels, said propeller mounted for rotation about a substantially vertical axis with the surface of the propeller in lateral contact with one side of the stream of glass for an appreciable depth, and means for rotating the propeller in a direction to propel the glass through the basin.

14. The combination with a furnace tank to contain molten glass, of a gathering basin located externally of the tank and having inlet and outlet channels opening into the tank, an insular wall laterally separating said channels, the latter connected at the outer end of the wall by a connecting channel providing a gathering station, said wall having a recess therein, a rotary propeller so positioned in said recess that it protrudes laterally therefrom at both sides of said insular wall, and means for rotating said propeller about a substantially vertical axis.

15. The combination with a glass furnace, of a gathering basin external to the furnace and having laterally separated inlet and outlet channels connected at their inner ends to the furnace and at their outer ends interconnected by a gathering channel, an insular wall external to the furnace and separating the inlet and outlet channels except at the gathering channel and having a recess sunk in the top of said wall to a depth below the level of glass in the channels, the base of said recess being appreciably above the bottom of said channels, a rotary propeller dipping into the glass in said recess and protruding laterally from both sides of said wall, means for rotating said propeller about a vertical axis, and covers completely covering in said channels except for the provision of a gathering opening.

16. The combination with a tank to contain molten glass, of a gathering basin located externally of the tank and having laterally separated inlet and outlet channels opening into the tank and an outer connecting channel providing a gathering station, a propeller extending through one side wall of one of said channels into one side of the stream of glass flowing through the channel and presenting to the said stream a substantially vertical surface forming a portion of the side wall of the channel, and means for moving said propeller in a direction to cause said surface as a whole to advance in the direction of the advancing stream and thereby cause propulsion of the stream of glass by lateral contact of an appreciable depth of one side of said stream with the said surface of said propeller, said propeller being vertically adjustable.

17. The combination with a tank to contain molten glass, of a gathering basin located externally of the tank and having laterally separated inlet and outlet channels opening into the tank and an outer connecting channel providing a gathering station, a propeller extending through one side wall of one of said channels into one side of the stream of glass flowing through the channel and presenting to the said stream a substantially vertical surface forming a portion of the side wall of the channel, means for moving said propeller in a direction to cause said surface as a whole to advance in the direction of the advancing stream and thereby cause propulsion of the stream of glass by lateral contact of an appreciable depth of one side of said stream with the said surface of said propeller, and means for adjustably varying the speed of movement of the propeller in the direction of propulsion.

18. The combination with a furnace tank, of a gathering basin located externally of the tank and having laterally separated inlet and outlet channels opening into the tank and an outer connecting channel providing a gathering station, of a rotary propeller extending partly through one side wall of one of said channels, said propeller mounted for rotation about a substantially vertical axis with the surface of the propeller in lateral contact with one side of the stream of glass for an appreciable depth, and means for rotating the propeller in a direction to propel the glass through the basin, said propeller being in the form of a smooth cylinder with its cylindrical surface contacting with the glass.

19. The combination with a tank to contain molten glass, of apparatus for circulating glass comprising a gathering basin located externally of the tank and having laterally separated inlet and outlet channels opening into the tank and an intermediate outer connecting channel providing a gathering station, said basin including a wall separating the inlet and outlet channels and forming a side wall of said channels, respectively, said wall having an opening intermediate its ends, a propeller extending into said opening, and means for rotating the propeller about a substantially vertical axis, said propeller positioned and arranged to engage a lateral surface of the stream flowing in said channels.

20. The combination with a tank to contain molten glass, of apparatus for circulating glass comprising a gathering basin located externally of the tank and having laterally separated inlet and outlet channels opening into the tank and an intermediate outer connecting channel providing a gathering station, said basin including a wall separating the inlet and outlet channels and forming a side wall of said channels, respectively, said wall having an opening intermediate its ends, a propeller extending into said opening, said propeller being positioned to protrude laterally into both the inlet channel and the outlet channel into contact with the glass flowing in said channels, and means for rotating said propeller about a substantially vertical axis in a direction to exert a propelling force outwardly from the tank on the glass in the inlet channel, and to exert a propelling force inwardly toward the tank on the glass flowing in the outlet channel.

ALEXANDER FRANCIS McNISH.